C. T. WESTLAKE.
LOCOMOTIVE TRAILER TRUCK.
APPLICATION FILED AUG. 11, 1919.

1,402,983.

Patented Jan. 10, 1922.
4 SHEETS—SHEET 1.

Inventor
Charles T. Westlake

C. T. WESTLAKE.
LOCOMOTIVE TRAILER TRUCK.
APPLICATION FILED AUG. 11, 1919.

1,402,983.

Patented Jan. 10, 1922.
4 SHEETS—SHEET 2.

Inventor
Charles T. Westlake
By [signature] Atty.

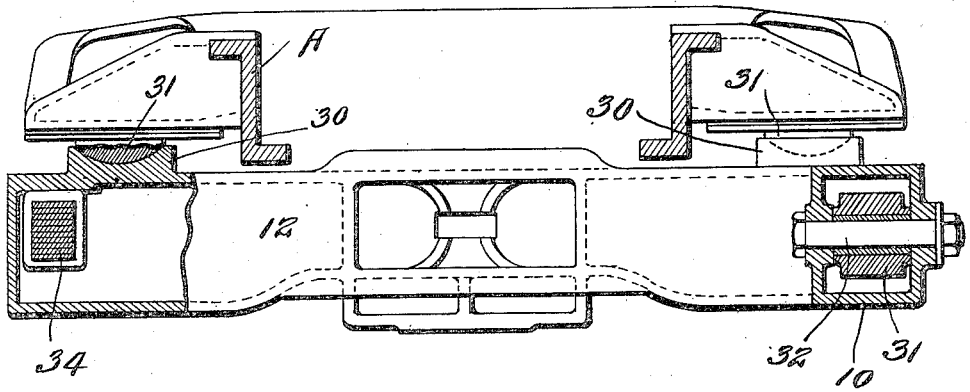
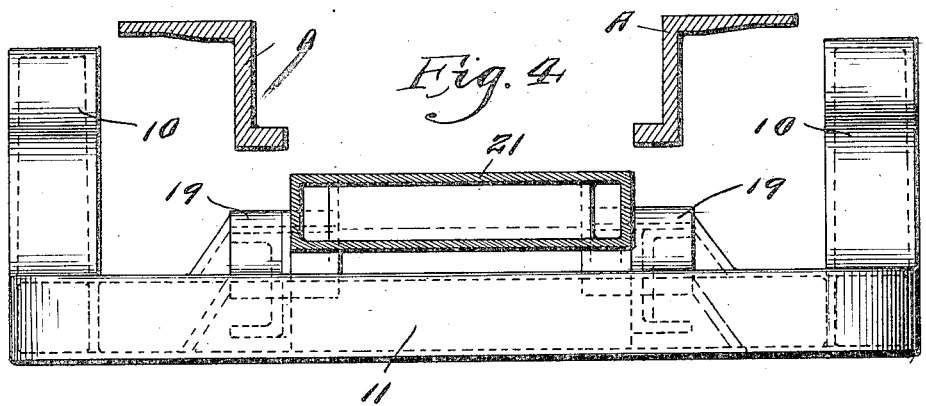
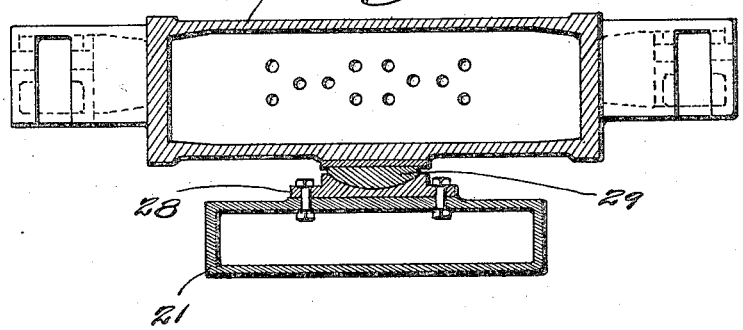

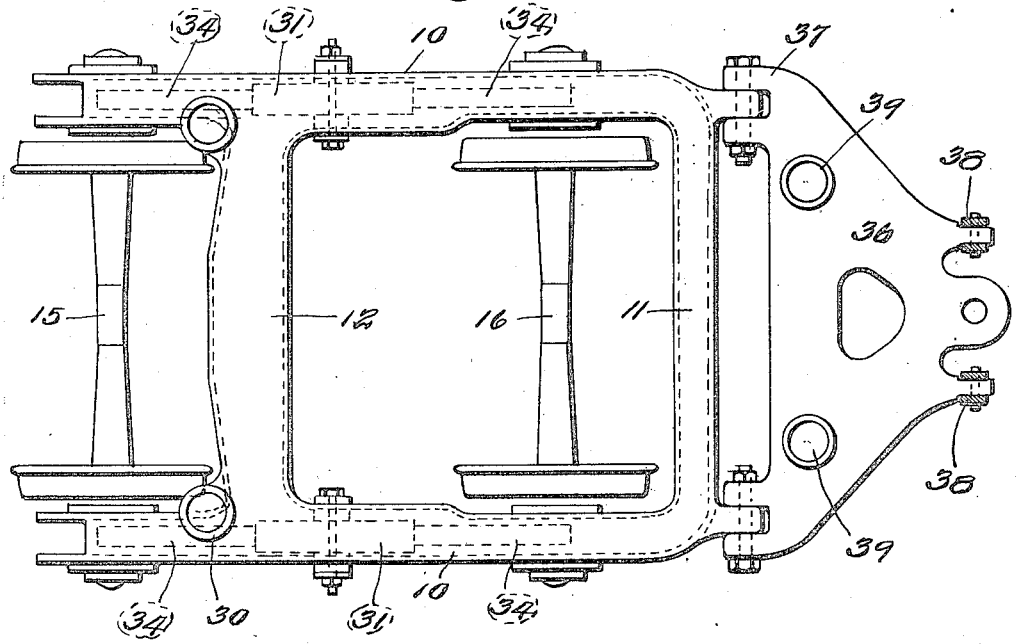

UNITED STATES PATENT OFFICE.

CHARLES T. WESTLAKE, OF ST. LOUIS, MISSOURI, ASSIGNOR TO COMMONWEALTH STEEL COMPANY, OF ST. LOUIS, MISSOURI, A CORPORATION OF NEW JERSEY.

LOCOMOTIVE TRAILER TRUCK.

1,402,983.　　　　Specification of Letters Patent.　　Patented Jan. 10, 1922.

Application filed August 11, 1919. Serial No. 316,618.

*To all whom it may concern:*

Be it known that I, CHARLES T. WESTLAKE, a citizen of the United States, residing at city of St. Louis, State of Missouri, have invented a certain new and useful Improvement in Locomotive Trailer Trucks; of which the following is a full, clear, and exact description, such as will enable others skilled in the art to which it appertains to make and use the same, reference being had to the accompanying drawings, forming part of this specification.

My invention relates to improvements in trailer trucks for locomotives, the principal object of my invention being to provide a truck, preferably of the four wheel type, that will serve to carry the load of the rear portion of the locomotive and to combine with said truck cooperating parts that will result in the provision of an auxiliary equalizing system for distributing the weight of the rear portion of the locomotive between the wheel carrying axles of the truck and in addition, said auxiliary equalizing system forming a part of and cooperating with the main equalizing system of the locomotive.

Further objects of my invention are to generally improve upon and simplify the construction of the trailer trucks now in general use; to provide a trailer truck having two or more wheel carrying axles thereby carrying the supported weight at four or more points on the track rails; to provide a trailer truck that will have a relatively high degree of flexibility so as to yield readily while in service; to connect the front end of the trailer truck frame with the locomotive frame and the main equalizing system of the locomotive by a member which performs the functions of a radius bar and an equalizing member; to provide a trailer truck frame which may be easily and cheaply produced and which combines great strength and rigidity with minimum weight, and further to provide a relatively simple trailer truck which will be effective in performing its intended functions.

With the foregoing and other objects in view, my invention consists in certain novel features of construction and arrangement of parts, hereinafter more fully described and claimed, and illustrated in the accompanying drawings, in which—

Figure 3 is an enlarged cross sectional view taken approximately on the line 3—3 of Figure 1.

Figure 4 is an enlarged cross sectional view taken approximately on the line 4—4 of Figure 1.

Figure 5 is an enlarged cross section taken approximately on the line 5—5 of Figure 1.

Figure 6 is a top plan view of a form of trailer truck having combined therewith a substantially triangular or wishbone shaped radius bar and equalizer member and which form of trailer truck frame is adapted to receive the weight of the rear portion of the locomotive at four points.

Figure 7 is a diagrammatic view of a modified arrangement of the elements constituting the auxiliary equalizing system of which my improved truck frame is a part.

Figure 8 is a diagrammatic view of a further modified form of the auxiliary equalizing system.

Figure 1:
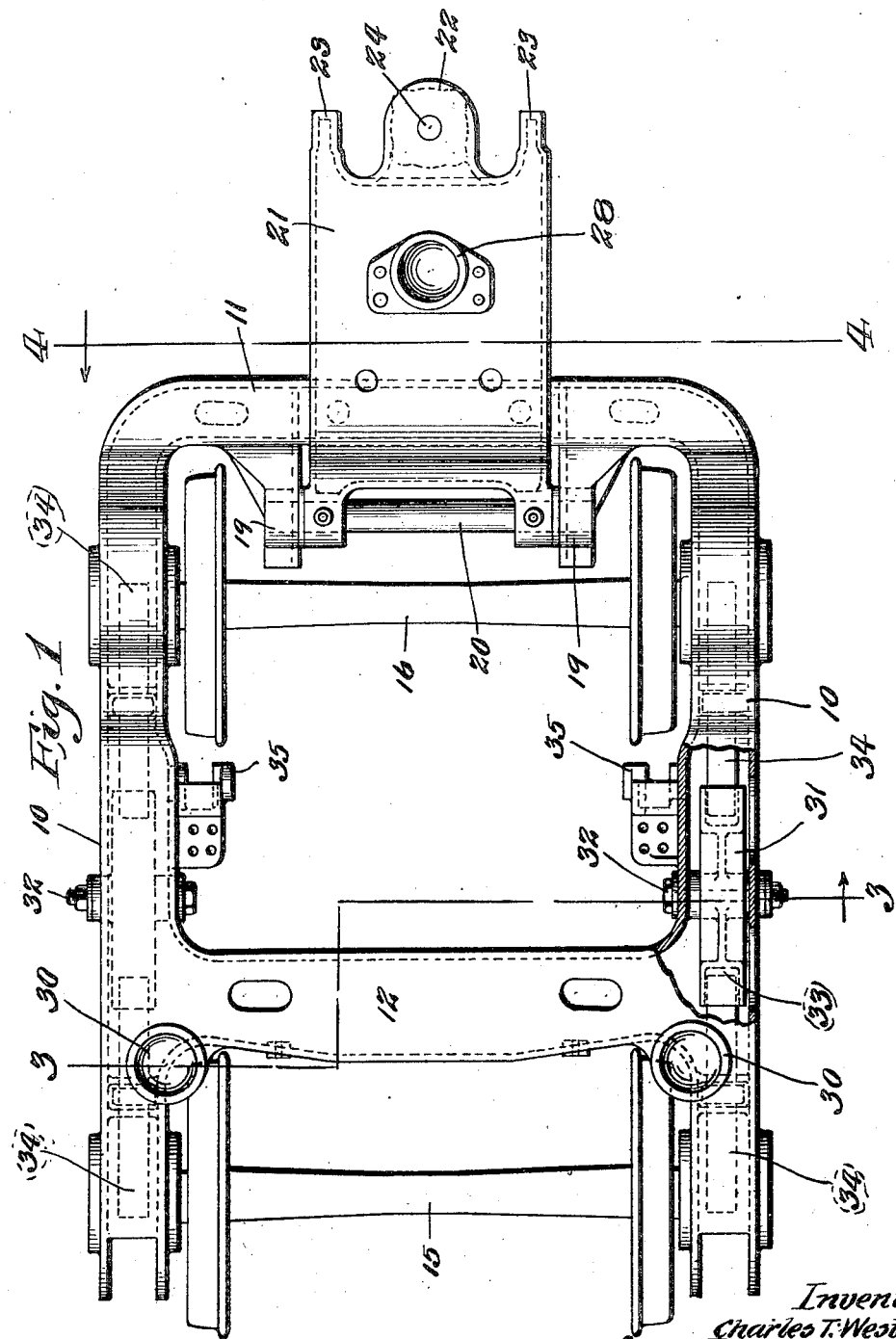
Figure 1 is a plan view of a trailer truck of my improved construction, the parts thereof being broken away.

Referring in detail to the accompanying drawings and particularly to the construction illustrated in Figures 1 to 5 inclusive, it will be seen that my improved trailer truck frame comprises a pair of side members 10 that are arranged substantially parallel with each other; a transversely disposed front end member 11, and a transversely disposed transom 12, the latter being located a short distance in front of the rear ends of the side members 10.

As illustrated, the members constituting the truck frame may be formed in a single piece, preferably by casting, or they may be separately formed and connected to each other in any suitable manner.

Further, the members may be of any desired cross sectional shape although, as illustrated, I prefer to form these members hollow and substantially box shape in cross section, thereby combining maximum strength and rigidity with minimum weight.

Furthermore, by making the side pieces 10 hollow, they form housings for certain parts of the equalizing system, hereinafter more fully described.

The rear portions of the side members 10 are provided with depending pedestal jaws 13 between which are arranged in the usual manner, the journal boxes 14 for the ends of the rear axle 15 of the truck. The ends of the front axle 16 are arranged in ordinary journal boxes 17, the latter being positioned between pedestal jaws 18 that depend from the front portions of the side members 10.

Figure 2:
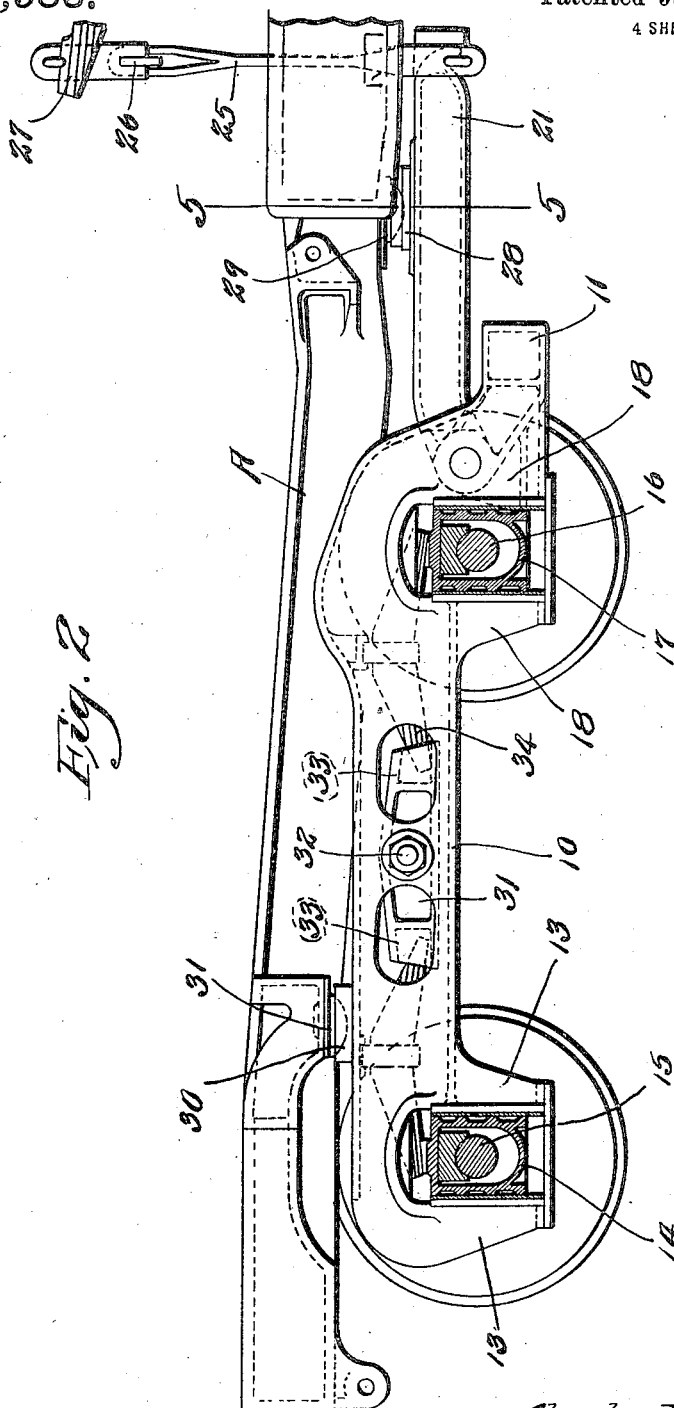
Figure 2 is an elevational view of a trailer truck of my improved construction and showing a portion of the locomotive frame supported thereby.

As illustrated in Figure 2, the front end member 11 occupies a plane slightly below the plane occupied by the side members 10 and formed integral with or fixed to this front end member and spaced a considerable distance apart are rearwardly projecting lugs or brackets 19. These brackets serve as supports for the end portions of a transversely disposed shaft 20 upon which is journaled the rear portion of a horizontally disposed forwardly extending radius bar 21. This radius bar overlies the front end member 11 of the truck frame and said bar is preferably cast in a single piece of box like structure and provided at its front end with a centrally arranged lug or extension 22 and with a pair of side lugs or extensions 23. The center lug 22 is provided with a vertical aperture 24 which serves as a bearing for a king pin or the like (not shown) which latter is seated in a part of the main frame of the locomotive and serves as the axis for the laterally swinging movement of the trailer truck frame.

Secured in any suitable manner to the side lugs or extensions 23 are the lower ends of vertically disposed links or hangers 25, the upper ends of which are supported by a transverse bar 26 that is supported by the rear ends of the rear driver springs 27, which is a part of the main equalizer system of the locomotive. Thus the truck frame 10, with its pivoted member 31, springs 34, vertically pivoted radius bar 21, and hangers 25 connected to the lugs 23, form part of the main equalizing system of the locomotive. Arranged on top of the combined radius bar and equalizer member 21 and preferably at a point near the center thereof is a bearing 28 for a friction pad 29, the latter serving as a support for a part of the main frame A of the locomotive (see Figure 2).

Formed on top of the rear portions of the side members 10 of the truck frame and adjacent to the ends of transom 12 are bearings 30 for friction pads 31 and which latter support the rear portion of the main frame A of the locomotive.

It will be noted that by the arrangement just described, the weight of the rear portion of the locomotive is carried at three points on the trailer truck frame, said points being at the bearings 28 and 30.

In order to distribute the weight carried by the trailer truck equally between the wheel carrying axles 15 and 16, I arrange within the central portions of each side member 10 of the frame, a rigid equalizing member 31 and mount the latter for vertical rocking movement upon a transversely disposed pin or bolt 32, the ends of which are seated in the side walls of the side member.

The end portions of each equalizing member are provided with pockets 33 and positioned therein are the ends of semi-elliptic springs 34, the opposite ends of which bear directly on top of the journal boxes 14 and 17. The central portions of these springs bear directly against the undersides of the top plates of the side members 10, and said springs, together with the rigid equalizing members 31, the truck frame, and the radius bar 21, constitute an equalizing system that is effective in distributing the weight of the rear portion of the locomotive equally between the axles of the trailer truck frame and said equalizer system being auxiliary to the main equalizing system of the locomotive.

Formed integral with or fixed to the central portions of the side members 10 and projecting inwardly therefrom are lugs or brackets 35 which serve as points of attachment for the brake hangers.

In the form of trailer truck illustrated in Figure 6, the combined radius bar and equalizer member 36 is substantially triangular or of wishbone shape when viewed in plan and its rear corners 37 are hinged in any suitable manner to the forward corners of the trailer truck frame, the axes of the hinged connections being horizontally disposed. The apex or forward end of this triangular radius bar is connected in the usual manner by a king pin to the locomotive frame and said forward end is also connected by suitable hangers or links 38 to the rear ends of the rear driver springs.

Formed on top of this radius bar 36 and preferably at points adjacent to its rear corners are bearings 39 which are adapted to receive friction pads that are disposed beneath parts of the main frame of the locomotive. There are two of these bearings 39 and they are arranged at equal distances to the sides of the medial line of the trailer truck and by such arrangement the weight of the rear portion of the locomotive is supported at four points on the trailer truck, namely, upon the pair of bearings 39 and the pair of bearings on the rear portion of the main frame of the trailer truck. Such an arrangement provides a very stable support for the weight of the rear portion of the locomotive and tends to minimize the lateral rocking movement of the body of the locomotive while the latter is in service.

In Figure 7, I have illustrated a modified arrangement of the equalizing members that are disposed within the side members of the truck frame and in this arrangement, semi-elliptic springs 40 bear at their centers upon the trailer truck journal boxes, the outer ends of said springs engaging inverted U-shaped shackles 41 that are pivotally connected to the side pieces of the truck frame. The inner ends of these springs 40 engage the upper portions of links or shackles 42, the lower portions of which are engaged by the ends of a rigid equalizing member 43, the latter being mounted for vertical rocking movement upon a pin or bolt 44 that is seated in the side walls of the side member of the truck frame.

In the modified construction illustrated in Figure 8, an elongated equalizing member 45 is disposed within the side member of the truck frame with its ends bearing directly on top of the journal boxes. Fulcrumed upon the transversely disposed pin 46 that is arranged at the center of this member 45, is a rigid equalizer member 47 and bearing upon the ends of the latter are the inner ends of semi-elliptic springs 48, the outer ends of the latter bearing upon the end portion of member 45. The central portions of these springs 48 bear against the top plate of the side member 10 of the truck frame.

In my improved trailer truck frame, it will be noted that the load or weight carried by the trailer truck frame is transmitted at two points on the main truck frame immediately in front of the rear axle of the trailer truck and upon the combined radius bar and equalizer member at one or two points in front of the front axle of the truck. By virtue of this arrangement, the truck frame becomes a part of the equalizing system of the locomotive and the combined radius bar and equalizer member associated with the truck frame will fulcrum at its load point either the bearing plate 28 or bearing plates 39 and as both front and rear ends of said member are free to move vertically, the rear end when moving carries the front end of the main truck frame with it and which latter fulcrums at its load point or bearings 30. The pairs of springs 34 and interposed equalizer members 33 constitute an equalizing system for the main trailer truck frame and distribute the loads transmitted to the latter equally to the two trailer truck axles. The outer ends of the springs 34 rest directly on top of the journal boxes and in normal position, prevent tilting of the boxes about the journals on the axles; but when the springs are tilted out of position by performing the functions of equalizers, their outer ends will pivot about the centers or axes of the axles.

A trailer truck of my improved construction is comparatively simple, provides a firm and substantial support for the rear portion of the locomotive and at the same time has the required degree of flexibility; is effective in distributing the supported weight equally between its two axles and is very efficient in performing its intended functions.

It will be readily understood that minor changes in the size, form and construction of the various parts of my improved locomotive trailer truck may be made and substituted for those herein shown and described, without departing from the spirit of my invention, the scope of which is set forth in the appended claims.

I claim:

1. The combination with the main frame of a locomotive, a four wheel trailer truck frame mounted for horizontal movement under the rear end thereof, and a radius bar pivotally connected to said trailer truck frame for vertical movement relative thereto and pivotally connected to said main frame for horizontal movement relative thereto.

2. The combination with the main frame of a locomotive, a trailer truck frame mounted for horizontal movement under the rear end thereof, and a radius bar pivotally connected to said trailer truck frame for vertical movement relative thereto and pivotally connected to said main frame for horizontal movement relative thereto, said main frame bearing upon said radius bar at a point between pivotal connections.

3. The combination of the main frame of a locomotive, a trailer truck frame having bearing relation thereto through the medium of friction plates whereby said trailer truck frame may move horizontally with respect to the main frame of the locomotive, and an articulated connection between the forward end of the trailer truck frame and the main frame of the locomotive, which articulated connection permits vertical movement of the trailer truck frame, and by a pivotal connection with the main frame, a horizontal movement of said truck frame.

4. The combination of a main frame of a locomotive, a four-wheel trailer truck frame, including its wheels, axles and journal boxes, said trailer truck frame and its carried parts being movable horizontally with respect to said main frame, a radius bar articulated for vertical movement with respect to said main frame, equalizing means associated with the main frame of the trailer truck frame for distributing the supported weight.

5. The combination with a locomotive and its main equalizing system, of a four wheel trailer truck pivotally connected at its forward end to the locomotive frame and located to the rear of the rear driving axle of said locomotive, and an equalizer system including a radius bar pivoted for vertical movement on the trailer truck and associated with the frame of said trailer truck and connected with the main equalizing system of the locomotive.

6. The combination with a locomotive, of a trailer truck frame pivotally connected at its forward end to the locomotive frame by means of a radius bar having vertical movement relative to said trailer truck frame, a plurality of wheel carrying axles supporting said trailer truck frame, and a main equalizing system associated with the frame of the locomotive and connected to said pivoted radius bar.

7. The combination with a locomotive, of a four wheel trailer truck pivotally connected at its forward end to the locomotive frame and flexibly connected to the main equalizing system of the locomotive and located to the rear of the rear driving axle of said locomotive.

8. The combination with a locomotive, of a trailer truck frame pivotally connected at its forward end to the locomotive frame and flexibly connected to the main equalizing system of the locomotive and located to the rear of the rear driver axle, and a plurality of wheel carrying axles supporting said trailer truck frame.

9. The combination with a locomotive, of a four wheel trailer truck pivotally connected at its forward end to the locomotive frame and flexibly connected to the main equalizing system of the locomotive and located to the rear of the rear driving axle of said locomotive, and bearings on said trailer truck frame.

10. The combination with a locomotive, of a trailer truck frame pivotally connected at its forward end to the locomotive frame and flexibly connected to the main equalizing system of the locomotive and located to the rear of the rear driver axle, a plurality of wheel carrying axles supporting said trailer truck frame, and bearings on said trailer truck frame.

11. The combination with a locomotive, of a four wheel trailer truck pivotally connected to the locomotive frame and flexibly connected to the main equalizing system of the locomotive and located to the rear of the rear driving axle of said locomotive, and an equalizer system associated with the frame of said trailer truck for distributing the supported weight between the axles of said trailer truck.

12. The combination with a locomotive, of a trailer truck frame pivotally connected to the locomotive frame and flexibly connected to the main equalizing system of the locomotive and located to the rear of the rear driver axle, a plurality of wheel carrying axles supporting said trailer truck frame, and an equalizing system associated with the frame of said trailer truck for distributing the supported weight equally upon the trailer truck axles.

13. A four wheel trailer truck adapted to be positioned beneath the rear portion of a locomotive frame for supporting a part of the weight thereof, and a combined radius bar and equalizer member flexibly connected to the forward portion of the trailer truck frame and pivotally connected at its forward end to the main frame of the locomotive so as to swing radially in a horizontal plane.

14. A four wheel trailer truck adapted to be positioned beneath the rear portion of a locomotive frame for supporting a part of the weight thereof, a combined radius bar and equalizer member flexibly connected to the forward portion of the trailer truck frame and pivotally connected at its forward end to the main frame of the locomotive so as to swing radially in a horizontal plane, and bearings on said combined radius bar and equalizer and the frame of the trailer truck.

15. The combination of the main frame of a locomotive, a four-wheel trailer truck frame, a radius bar pivoted for horizontal movement to the main frame and for vertical movement to the trailer truck frame, there being rocking supports and friction plates interposed between the main frame and the trailer truck frame at a point between the axles of the latter, and there being a rocking frictional support between the main frame and the radius bar between the pivotal points of the latter.

16. A trailer truck frame adapted to be disposed beneath the rear portion of a locomotive frame and pivotally connected at its forward end to the latter by means of a radius bar pivotally connected to said trailer truck frame and having vertical movement relative thereto, a plurality of wheel carrying axles journaled in said trailer truck frame, and an equalizer system associated with the trailer truck frame for distributing the supported weight between the axles of the trailer truck.

17. A trailer truck frame adapted to be disposed beneath the rear portion of a locomotive frame and pivotally connected at its forward end to the latter by means of a radius bar having a vertical movement with respect to said trailer truck frame and a horizontal movement with respect to the locomotive frame, a plurality of wheel carrying axles journaled in said trailer truck frame, bearings on the trailer truck frame, and an equalizer system associated with the trailer truck frame for distributing the supported weight between the axles of the trailer truck.

18. The combination with a locomotive, of a combined radius bar and equalizer member pivotally connected at its forward end to the locomotive frame for lateral swinging movement, and a four wheel trailer truck flexibly connected to the rear portion of said combined radius bar and equalizer.

19. The combination with a locomotive, of a combined radius bar and equalizer member pivotally connected at its forward end to the locomotive frame for lateral swinging movement, a four wheel trailer truck flexibly connected to the rear portion of said bearings on said combined radius bar and equalizer, and bearings on said combined radius bar and equalizer and the frame of the trailer truck.

20. The combination with a locomotive, of a combined radius bar and equalizer member pivotally connected at its forward end to the locomotive frame for lateral swinging movement, a four wheel trailer truck flexibly connected to the rear portion of said combined radius bar and equalizer, and equalizing means associated with the frame of the trailer truck for distributing the supported weight between the axles of said trailer truck.

21. The combination with a locomotive, of a combined radius bar and equalizer pivotally connected at its forward end to the locomotive frame for lateral swinging movement, a trailer truck flexibly connected to the rear portion of said combined radius bar and equalizer, and a plurality of wheel carrying axles journaled in said trailer truck frame.

22. The combination with a locomotive, of a combined radius bar and equalizer pivotally connected at its forward end to the locomotive frame for lateral swinging movement, a trailer truck flexibly connected to the rear portion of said combined radius bar and equalizer, a plurality of wheel carrying axles journaled in said trailer truck frame, and equalizing means associated with the trailer truck frame for distributing the supported weight upon the axles of the trailer truck.

23. A four-wheel truck frame, wheels, axles and journal boxes, a radius bar pivoted for vertical movement at or near the forward end of said truck frame, said radius bar having means for pivotal connection to the main frame of the locomotive for horizontal movement, socket bearings on said trailer truck frame at a point between the axles thereof, and a socket bearing on said radius bar located between the points of its pivotal connection to the trailer truck frame and the main frame of a locomotive.

24. A trailer truck frame comprising side frames and cross members and pedestal jaws integrally connected together, the forward cross frame having means for the pivotal connection of a radius bar, and a radius bar pivotally connected for vertical movement to said means.

25. A trailer truck for locomotives comprising a truck frame, a plurality of wheel carrying axles journaled therein, a radius bar pivotally connected to the forward portion of said frame for vertical movement, said radius bar being also pivotally connected to the frame of the locomotive with which the trailer truck is associated whereby said trailer truck may swing in a substantially horizontal plane, and equalizer means associated with the trailer truck frame for distributing the supported weight upon the axles thereof.

26. A trailer truck for locomotives comprising a truck frame, a plurality of wheel carrying axles journaled therein, means connected to the forward portion of said frame and adapted to be connected at its forward end to the frame of the locomotive with which the trailer truck is associated whereby said trailer truck may swing in a substantially horizontal plane, bearings on said connecting means and trailer truck frame, and equalizer means associated with the trailer truck frame for distributing the supported weight upon the axles thereof.

27. In a trailer truck for locomotives, a frame, a plurality of pairs of journal boxes arranged in said frame, wheel carrying axles having their ends arranged in said journal boxes, equalizer members fulcrumed on the frame between the journal boxes, equalizer springs cooperating with said fulcrumed equalizers for distributing the supported weight between the axles of the truck, and a radius bar hinged for vertical movement to the forward end of the trailer truck frame and projecting forwardly therefrom, which radius bar is adapted to be pivotally connected at its forward end to the frame of the locomotive for horizontal movement relative thereto, a locomotive frame, and a main equalizing system therefor, said radius bar being connected to the main equalizing system of the locomotive.

28. In a trailer truck for locomotives, a frame, a plurality of pairs of journal boxes arranged in said frame, wheel carrying axles having their ends arranged in said journal boxes, equalizer members fulcrumed on the frame between the journal boxes, equalizer springs cooperating with said fulcrumed equalizers for distributing the supported weight between the axles of the truck, a combined radius bar and equalizer member adapted to be connected to the locomotive frame for lateral swinging movement, the rear portion of which combined radius bar and equalizer is flexibly connected to the front portion of the trailer truck frame, and bearings on said combined radius bar and equalizer and the trailer truck frame.

29. A trailer truck having a plurality of axles, a combined radius bar and equalizer flexibly connected to the forward portion of the frame of the trailer truck and adapted to be connected to the frame of the locomotive with which the trailer truck is associated whereby the trailer truck has lateral swinging movement, a plurality of bearings on the frame of the trailer truck, and a bearing on the combined radius bar and equalizer.

30. The combination with a locomotive and the main equalizer system associated therewith, of a trailer truck associated with said locomotive and adapted to support a portion of the weight thereof, said trailer truck having a plurality of wheel carrying axles, equalizing means associated with said trailer truck for distributing the supported weight between the axles of said truck, connections between said trailer truck and parts of the main equalizing system of the locomotive, and a radius bar hinged to the forward end of the trailer truck frame and the forward end of which radius bar is pivotally connected to the main frame of the locomotive so as to permit the trailer truck to swing radially beneath said locomotive frame.

In testimony whereof I hereunto affix my signature this 8th day of August, 1919.

CHARLES T. WESTLAKE.